(12) United States Patent
Kang et al.

(10) Patent No.: US 12,554,516 B2
(45) Date of Patent: Feb. 17, 2026

(54) METHOD FOR HIGHLIGHTING LYRIC AND USER TERMINAL FOR PROVIDING SAME

(71) Applicant: KAKAO ENTERTAINMENT CORP., Seongnam-si (KR)

(72) Inventors: Hae Na Kang, Seongnam-si (KR); Ji Hoon Chung, Seoul (KR); Yu Jin Kim, Seongnam-si (KR)

(73) Assignee: Kakao Entertainment Corp., Seongnam-si (KR)

( * ) Notice: Subject to any disclaimer, the term of this patent is extended or adjusted under 35 U.S.C. 154(b) by 126 days.

(21) Appl. No.: 18/549,331

(22) PCT Filed: Feb. 9, 2022

(86) PCT No.: PCT/KR2022/001961
§ 371 (c)(1),
(2) Date: Sep. 6, 2023

(87) PCT Pub. No.: WO2022/191446
PCT Pub. Date: Sep. 15, 2022

(65) Prior Publication Data
US 2024/0184601 A1    Jun. 6, 2024

(30) Foreign Application Priority Data

Mar. 9, 2021  (KR) ........................ 10-2021-0030759

(51) Int. Cl.
G06F 3/048      (2013.01)
G06F 9/451      (2018.01)
G10H 1/36       (2006.01)

(52) U.S. Cl.
CPC ............. *G06F 9/451* (2018.02); *G10H 1/361* (2013.01); *G10H 2220/011* (2013.01)

(58) Field of Classification Search
CPC ... G06F 9/451; G10H 1/361; G10H 2220/011
See application file for complete search history.

(56) References Cited

U.S. PATENT DOCUMENTS

2012/0221975 A1*  8/2012  Juristovski ............ H04L 65/403
                                                            715/823
2013/0275506 A1* 10/2013  Warner ................. H04L 67/535
                                                            709/204

(Continued)

FOREIGN PATENT DOCUMENTS

JP    2013-045131 A    3/2013
JP    2017-532646 A    11/2017

(Continued)

OTHER PUBLICATIONS

International Search Report dated May 6, 2022 in International Application No. PCT/KR2022/001961.

(Continued)

*Primary Examiner* — Mahelet Shiberou
(74) *Attorney, Agent, or Firm* — Knobbe, Martens, Olson & Bear, LLP

(57) ABSTRACT

A method for highlighting lyrics of a sound source is disclosed. A method for highlighting lyrics according to the present invention includes the steps of: displaying, by a user terminal, lyrics of a sound source; receiving, by the user terminal, an input of a user's interaction to select part of the lyrics; displaying, by the user terminal, the selected part of the lyrics to be distinguished from other parts; and when an input of the user's interaction desiring to share shared information including the selected part of the lyrics with a server or other terminal is received, transmitting, by the user terminal, the shared information to the server or the other terminal.

12 Claims, 11 Drawing Sheets

(56) References Cited

U.S. PATENT DOCUMENTS

| | | | | |
|---|---|---|---|---|
| 2015/0339034 A1* | 11/2015 | Garcia | .................. | G06F 40/169 |
| | | | | 715/738 |
| 2021/0097135 A1* | 4/2021 | Tian | ...................... | G06F 40/169 |
| 2021/0117573 A1* | 4/2021 | Lewbel | ............... | G06F 21/6254 |
| 2022/0248187 A1* | 8/2022 | Reese | .................. | H04L 51/046 |

FOREIGN PATENT DOCUMENTS

| | | | |
|---|---|---|---|
| KR | 10-2007-0080481 A | 8/2007 |
| KR | 10-2012-0137542 A | 12/2012 |
| KR | 10-2013-0114527 A | 10/2013 |
| KR | 10-2014-0117238 A | 10/2014 |
| KR | 10-2015-0054375 A | 5/2015 |

OTHER PUBLICATIONS

Office Action received in Japanese Patent Application No. 2023-554821 dated Aug. 20, 2024 in 5 pages.

* cited by examiner

METHOD FOR HIGHLIGHTING LYRIC AND USER TERMINAL FOR PROVIDING SAME

TECHNICAL FIELD

The present invention relates to a method for highlighting lyrics and a user terminal providing the same, and more particularly, to a method and terminal for displaying and sharing lyrics selected by a user among lyrics of a sound source.

BACKGROUND

With the development of wireless Internet and mobile terminals or the like, the method of consuming sound source contents has changed to a form in which a user connects to a sound source service through a terminal and receives sound sources in a streaming method. These sound source services not only provide music through streaming, but also provide various information such as lyrics and artist information.

Recent sound source services provide a variety of services that allow users to create their own albums or share their favorite music with other users through SNS, etc. to reflect users' diverse tastes and provide improved services.

Most of the existing user-driven services were services for albums or individual sound sources (songs). However, there was no service that could reflect the user's taste for a part included in an individual sound source and store or manage it separately.

DETAILED DESCRIPTION OF THE INVENTION

Technical Tasks

The present invention is directed to providing a method for selecting a part of lyrics of a sound source by highlighting and displaying the selected part to be distinguished from other parts, and a user terminal providing the same.

The present invention is directed to providing a method for sharing a part selected by a user among lyrics of a sound source with other users and a user terminal for providing the same.

The present invention is directed to providing a method for displaying information about at least one other user's selection of a part of the lyrics of the sound source, and a user terminal providing the same.

Technical Solution

A method for highlighting lyrics of the present invention for solving the above problems includes displaying, by a user terminal, lyrics of a sound source: receiving, by the user terminal, an input of a user's interaction to select part of the lyrics: displaying, by the user terminal, the selected part of the lyrics to be distinguished from other parts: and when an input of the user's interaction desiring to transmit shared information including the selected part of the lyrics to a server or other terminal is received, transmitting, by the user terminal, the shared information to the server or the other terminal.

In an embodiment of the present invention, the method may further comprise providing, by the user terminal, an interface capable of changing the shared information, and when receiving an input of a user's interaction desiring to change the shared information through the interface, displaying, by the user terminal, the shared information changed according to the user's interaction desiring to change.

In an embodiment of the present invention, the interface may be an interface related to any one of a function of changing a background image of the shared information and a function of selecting whether or not to display a user's identifier in the shared information.

In an embodiment of the present invention, the method may further include storing, by the user terminal, the shared information in a storage space of the user terminal when receiving, by the user terminal, a user's interaction desiring to store the shared information.

In an embodiment of the present invention, the shared information may include a link for playing back the sound source.

In an embodiment of the present invention, the link may be a link in which playback starts from a point corresponding to a selected part of the lyrics of the sound source or moved by a predetermined section from the point.

In an embodiment of the present invention, when the user terminal plays back the sound source, the user terminal may output information related to a selected part of the lyrics.

In an embodiment of the present invention, the outputting of the information may be at least one of displaying a fact that there is a selected part of the lyrics, displaying a selected part of the lyrics, and outputting a part corresponding to the selected part of the lyrics of the sound source to be distinguished from other parts.

In an embodiment of the present invention, the method may further include displaying, by the user terminal, information about at least one other user's selection of a part of the lyrics of the sound source.

In an embodiment of the present invention, in the displaying the information selected by the other user, the user terminal may display a specific part of the lyrics of the sound source to be distinguished according to the number of users selected.

In an embodiment of the present invention, in the displaying the information selected by the other user, the user terminal may display information of the other user together.

In an embodiment of the present invention, the method may further include displaying, by the user terminal, information including a selected part of lyrics of at least one sound source.

A user terminal providing lyrics highlighting of the present invention for solving the above problems includes a memory: a processor connected to the memory and configured to execute instructions contained in the memory: an input device for receiving information under the control of the processor: an output device for outputting information under the control of the processor: and a communicator that transmits information to the outside under the control of the processor, wherein the processor controls to display lyrics of a sound source through the output device, controls to receive a user's interaction desiring to select a part of the lyrics through the input device, controls to display a selected part of the lyrics through the output device to be distinguished from other parts, and when receiving a user's interaction desiring to transmit the selected part of the lyrics to a server or other terminal through the input device, controls to transmit shared information including the selected part of the lyrics to the server or the other terminal through the communicator.

A method for providing lyrics highlighting information of the present invention for solving the above problems includes providing, by a server, lyrics of a sound source to a user terminal; receiving, by the server, information about a user's selection of some of the lyrics from the user terminal; receiving, by the server, a request, from the user terminal, desiring to share shared information including a selected part of the lyrics with other terminal: and providing, by the server, the shared information to the other terminal.

In an embodiment of the present invention, the shared information may include a link for playing back the sound source, and the method may further include providing, by the server, the sound source to the other terminal when a request for playing back the sound source is received from the other terminal through the link.

In an embodiment of the present invention, the link may be a link in which playback starts from a point corresponding to a selected part of the lyrics of the sound source or moved by a predetermined section from the point, and in the providing the sound source, the server may provide the sound source from the point corresponding to the selected part of the lyrics to the other terminal.

In an embodiment of the present invention, the method may further include providing, by the server, information about at least one other user selecting a part of the lyrics of the sound source to the user terminal.

A server providing lyrics highlighting information according to the present invention for solving the above problems includes a memory: and a processor connected to the memory and configured to execute instructions contained in the memory, and the processor provides lyrics of a sound source to a user terminal, receives information about a user's selection of some of the lyrics from the user terminal, receives a request from the user terminal desiring to share shared information including a selected part of the lyrics with other terminal, and provides the shared information to the other terminal.

Advantageous Effects

The method for highlighting lyrics and user terminal providing the same of the present invention has an advantage that can provide a new experience for a user in relation to appreciating a sound source by displaying a part selected by the user among lyrics of the sound source to be distinguished from other parts or sharing the part with other users.

DETAILED DESCRIPTION OF THE EMBODIMENTS

Figure 1:
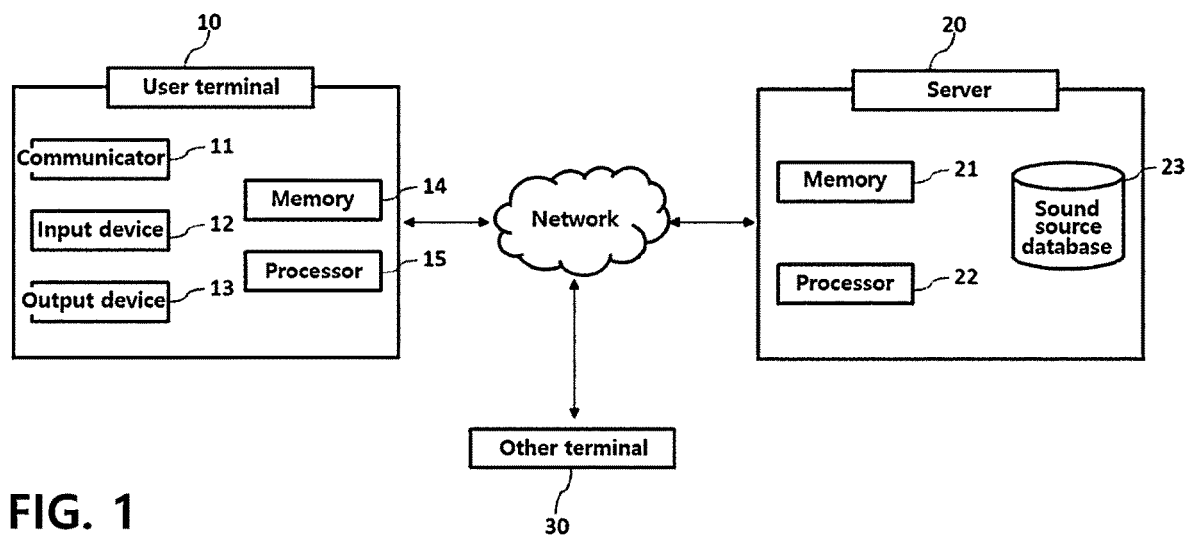
FIG. 1 is a diagram illustrating an example of an internal configuration of a user terminal and a network environment connected to the user terminal according to an exemplary embodiment of the present invention.

Hereinafter, the embodiments disclosed in this specification will be described in detail with reference to the accompanying drawings, but the same or similar components are assigned the same reference numerals regardless of reference numerals, and redundant description thereof will be omitted. In addition, in describing the embodiments disclosed in this specification, if it is determined that a detailed description of a related known technology may obscure the gist of the embodiments disclosed in this specification, the detailed description thereof will be omitted.

Terms including ordinal numbers such as first and second may be used to describe various elements, but these elements are not limited by the above-described terms. The above-described terms are used only for the purpose of distinguishing one element from another.

Expressions in the singular include plural expressions unless the context clearly indicates otherwise.

In this application, each step described can be performed regardless of the listed order, except for the case where it must be performed in the listed order due to a special causal relationship.

It is understood that the terms "comprise" or "have", when used in the present application, are intended to specify the presence of stated features, integers, steps, operations, elements, components or a combination thereof described in the specification but not preclude the possibility of the presence or addition of one or more other features, integers, steps, operations, elements, components, or a combination thereof.

Hereinafter, the present invention will be described with reference to the accompanying drawings.

FIG. 1 is a diagram illustrating an example of an internal configuration of a user terminal 10 and a network environment connected to the user terminal 10 according to an exemplary embodiment of the present invention.

A network environment according to an embodiment of the present invention shown in FIG. 1 may include a user terminal 10, a server 20, and another terminal 30.

The network is not limited in communication method, and may include not only a communication method utilizing a communication network (e.g., a mobile communication network, wired Internet, wireless Internet, and broadcasting network) that the network may include, but also short-range wireless communication.

The user terminal 10 may be a fixed terminal implemented as a computer device or a mobile terminal. For example, the user terminal 10 may include a smartphone, a mobile phone, a tablet PC, a computer, a laptop computer, and personal digital assistants (PDAs), and the like. For example, the user terminal 10 may communicate with the server 20 through a network using a wireless or wired communication method.

Such a user terminal 10 may be used by a user. The term "user" may refer to a user of the user terminal 10 or an account registered as a user in the sound source providing service provided by the server 20. Therefore, the meaning that the server 20 transmits certain information to the user may mean that it is transmitted to the user terminal 10 through the user's account registered in the server 20.

The user terminal 10 may include a communicator 11, an input device 12, an output device 13, a memory 14 and a processor 15.

The communicator 11 may communicate with the server 20 or other terminal 30 in a wired/wireless manner.

The input device 12 may receive an input of various types of information through a user's manipulation and input behavior. Such an input device 12 may be a touch screen module, a keyboard, a mouse, a button, a camera, a stylus, and a microphone, and the like.

The user terminal 10 may receive an input of a user's interaction through the input device 12. Interaction means that a user manipulates the input device 12 to input information reflecting the user's selection or intention to the user terminal 10.

The output device 13 may output various types of information. The output device 13 may be a display device, a speaker, a vibration generating device, a tactile sensation generating device, and the like. In some cases, the output device 13 may be a device (e.g., Bluetooth earphone) that is connected to the user terminal 10 through wired or wireless communication (e.g., short-range wireless communication such as Bluetooth) to receive and output signals.

The memory 14 functions as a storage medium and may store a plurality of application programs running in the user terminal 10, data and commands for operating the user terminal 10. In an embodiment, the memory 130 may store applications related to playing back sound source and applications related to highlighting lyrics.

Such memory 14 may be provided in the form of various storage devices such as ROM, RAM, flash drive, hard drive, etc. in terms of hardware, or may be provided in the form of web storage.

The processor 15 may control overall operations of the communicator 11, the input device 12, the output device 13, and the memory 14 to execute applications related to playing sound source and applications related to highlighting lyrics.

The server 20 may be implemented as a computer device or a plurality of computer devices that communicate with the user terminal 10 through a network to provide commands, codes, files, contents, services, and the like.

The server 20 may include a sound source database 23 or may be connected to the sound source database 23 through a network. The sound source database 23 includes digital music or sound data that can be downloaded or streamed to the user terminal 10. The sound source database 23 may include various information related to sound sources. The information related to the sound source may be, for example, all information related to the sound source, such as lyrics, title, lyricist, composer, producer, artist, personal information such as the agency or age of the artist, type, genre, and popularity of the sound source. The server 20 may use the sound source database 23 to provide the user terminal 10 with a sound source and information related to the sound source.

Other terminal 30 is similar to the user terminal 10 described above. Therefore, among the characteristics of other terminal 30, the description will focus on the differences from the user terminal 10.

The user terminal 10 may transmit/receive information with other terminal 30 through the server 20 or directly through a network.

Other terminal 30 may be used by other user than the user. Here, the other user may not be a user registered in the sound source providing service provided by the server 20. Also, an application related to sound source playback may not be stored in other terminal 30.

Here, a predetermined relationship may exist between a user and other users. For example, the user and other users may be friends in an instant message service or SNS, or contact information of other users may be stored in the user terminal 10.

The user terminal 10 of the present invention may receive information on a sound source and lyrics of the sound source from the server 20 through the communicator 11. The user terminal 10 may output the received sound source through the output device 13 such as a speaker or an earphone. In addition, the user terminal 10 may display lyrics of the received sound source through the output device 13 such as a display. Further, the user terminal 10 may receive an input of a user's interaction for selecting some of the lyrics displayed on the output device 13 through the input device 12. Here, the interaction may be a result of a user manipulating a touch screen module, a keyboard, a mouse, a button, a stylus, and the like. Also, the user terminal 10 may transmit shared information including a selected part of the lyrics to the server 20 or other terminal 30 through the communicator 11.

A specific operating embodiment of the user terminal 10 including the above-described operation will be described in more detail with reference to FIGS. 2 to 10 below.

Hereinafter, an embodiment of a method for highlighting lyrics by the user terminal of the present invention will be described with reference to FIGS. 2 and 3.

Figure 2:
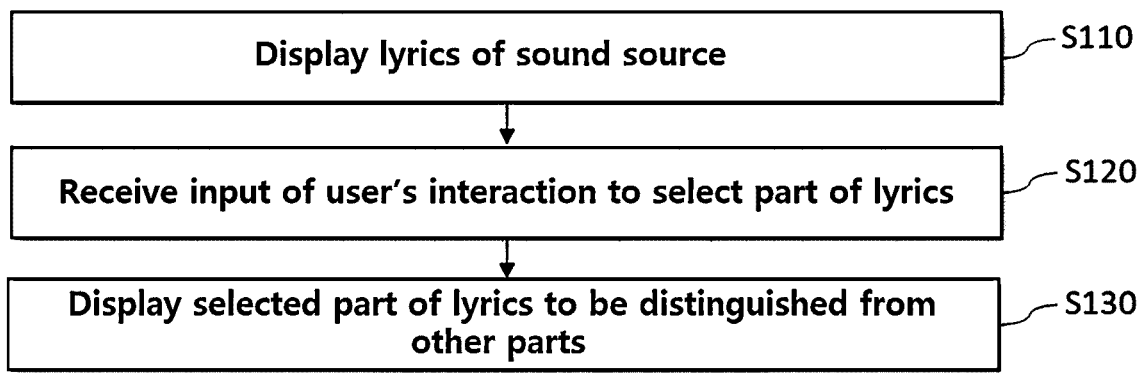
FIG. 2 is a flowchart of an embodiment of a method for highlighting lyrics by a user terminal.

FIG. 2 is a flowchart of an embodiment of a method for highlighting lyrics.

In step S110, the user terminal 10 displays lyrics of a sound source.

The user terminal 10 may display lyrics received from the server 20 through the output device 13 such as a display. The sound source of the lyrics may be a sound source that is currently being played back or may be a sound source that is not currently being played back but is selected by the user to display the lyrics.

The user terminal 10 may provide a selection interface 310 while displaying lyrics in step S110. When the user performs an interaction with the selection interface 310, the lyrics selection mode is activated, and the user may be able to select some of the lyrics. On the other hand, in a state in which the lyrics selection mode is deactivated, some of the lyrics may not be selected even if the user performs an interaction for selecting some of the lyrics. If the corresponding sound source is a currently played back sound source, in a state in which the lyrics selection mode is deactivated, the lyrics of the currently played back section may be displayed to be distinguished from other parts.

In step S120, the user terminal 10 receives an input of a user's interaction for selecting a part of lyrics.

The user terminal 10 may receive an input of the user's interaction with the selection interface 310 before step S120 is performed. Accordingly, the user terminal 10 activates the lyrics selection mode, and receives an input of a user's interaction for selecting some of the lyrics in step S120.

A user's interaction for selecting a part of the lyrics may be implemented in various ways. For example, a user may perform an interaction by selecting a part of lyrics. Also, the user may perform an interaction by selecting and dragging a part of the lyrics. In addition, the user may perform an interaction by selecting a button (not shown) indicated as "lyric highlighting" or the like while a part of the lyrics to be selected is being played back, rather than selecting the lyrics itself.

Some of the lyrics selected by the user may be a part of a word, a single word, a set of two or more words, a sentence, or a set of two or more sentences. Also, some of the lyrics selected by the user may be one or two or more parts.

The user terminal 10 may activate the lyrics selection mode several times and receive an input of a user's interaction for selecting some of the lyrics several times.

In step S130, the user terminal 10 displays the selected part of lyrics to be distinguished from other parts.

The user terminal 10 displays some of the lyrics selected according to the interaction received in step S120 to be distinguished from other parts in various ways. For example, a selected part of lyrics may be displayed with a difference in text color, font size, font, underline, and italic from other parts.

Figure 3:
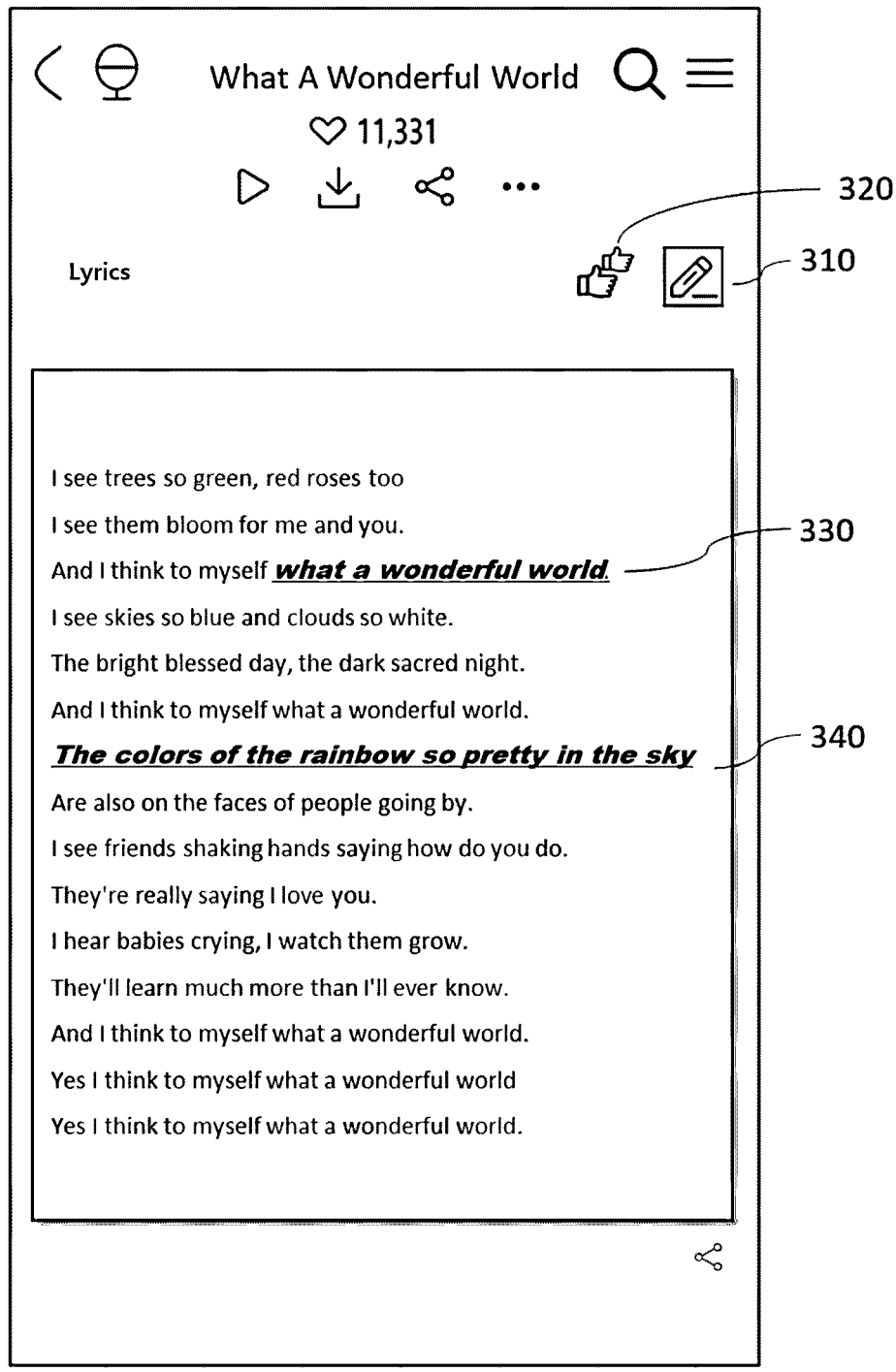
FIG. 3 illustrates an example of a screen of a user terminal in which highlighting of lyrics in step S130 is implemented.

FIG. 3 illustrates an example of a screen of a user terminal 10 in which highlighting of lyrics in step S130 is implemented.

As shown in FIG. 3, the lyrics of the sound source are displayed on the screen of the user terminal 10. A selection interface 310 may be provided on the screen of the user terminal 10. And, some 330 and 340 of the lyrics selected by the user may be displayed to be distinguished from other parts.

Hereinafter, an embodiment of a method for sharing highlighted lyrics by the user terminal 10 of the present invention will be described with reference to FIGS. 4 and 6.

Figure 4:
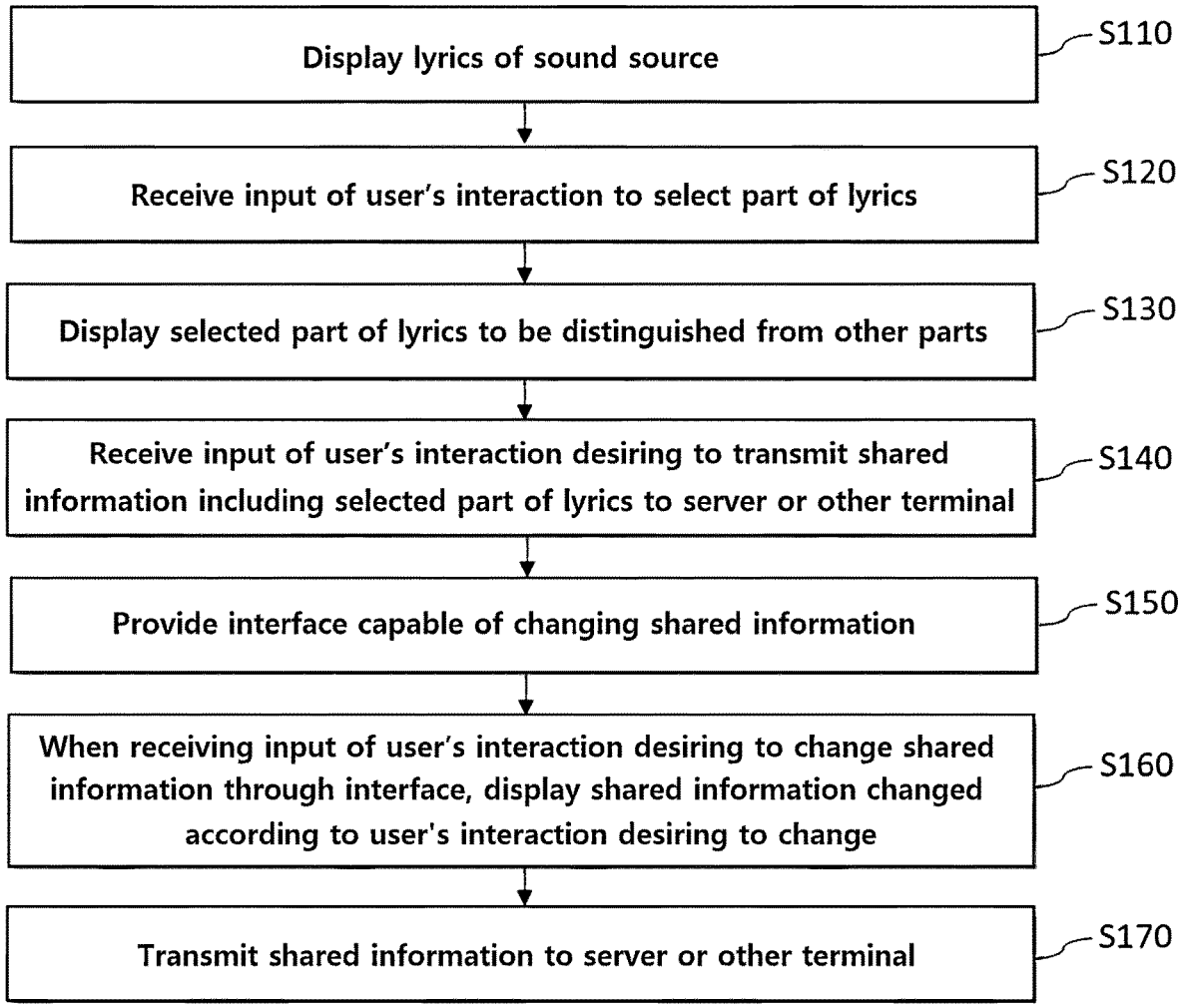
FIG. 4 is a flowchart of an embodiment of a method for sharing highlighted lyrics.

FIG. 4 is a flowchart of an embodiment of a method for sharing highlighted lyrics.

Steps S110, S120, and S130 are the same as those described above, so descriptions thereof will be omitted.

In step S140, the user terminal 10 transmits shared information including the selected part of the lyrics to the server 20 or receives an input of a user's interaction desiring to share with other terminal 30.

The user terminal 10 may transmit shared information including a selected part of lyrics to the server 20 or provide an interface 320 related to a function of sharing to other terminal 30. An exemplary form of such an interface is shown in interface 320 of FIG. 3. The user can select this interface 320 to perform an interaction desiring to transmit shared information to the server 20 or to share it with other terminal 30.

Here, the shared information 510 is information including the selected parts 330 and 340 of the lyrics and means information transmitted to the server 20 or shared with other terminal 30. The shared information may include a title 511 of the sound source, an artist 512, and an identifier 513 of a user who selected the lyrics, in addition to the selected part of the lyrics. In addition, in some cases, the shared information may include a visual image or photo or the like selected by the user.

In step S150, the user terminal 10 provides an interface capable of changing shared information.

The user terminal 10 may switch the screen from a screen displaying lyrics to a screen displaying shared information in step S150 and output the same. In this case, the displayed shared information may be shared information in a basic state to which no user change is applied. Specifically, shared information in a basic state may be one displayed in a screen, background, color, font, or the like determined as a default in the system. Also, it may be possible for the user to change the default settings.

In addition, change interfaces 520 and 530 for changing shared information may be provided on this screen. The change interface may provide various functions for correcting, altering, and editing shared information.

For example, some 520 of the change interfaces may be related to a function of changing a background image of shared information. Through this change interface, it is possible to change the color of the background of shared information or to change the background to a photo or visual image selected by the user.

In addition, some 530 of the change interfaces may be related to a function of selecting whether to display a user's identifier (e.g., user's name or ID) in shared information. Through this change interface, it is possible to select to display the user's identifier 513 in a portion of shared information or to change the location where the identifier is displayed.

In addition, some (not shown) of the change interfaces may be related to a function of adjusting the size and font of characters displayed in shared information.

In addition, some (not shown) of the change interfaces may be related to a function allowing the user to input additional information to shared information. Through this change interface, it is possible for the user to insert a desired message or image or the like.

In step S160, when the user terminal 10 receives an input of a user's interaction desiring to change shared information through an interface, it displays the shared information changed according to the user's interaction desiring to change.

The user terminal 10 may display the shared information changed in step S160 so that the user can visually check the shared information. After checking the changed shared information, the user may perform an interaction of transmitting the shared information to the server 20 or other terminal 30.

In step S170, the user terminal 10 transmits the shared information to the server 20 or other terminal 30. Before the user terminal 10 performs step S170, it may receive an input of an interaction through the interface 550 related to the user's transmitting of shared information.

The user terminal 10 may convert the shared information into a transmittable file format such as an image in step S170 and transmit the same to the server 20 or other terminal 30. Here, the shared information may include a link 610 capable of playing back a corresponding sound source. When the shared information is transmitted to other terminal 30, the other terminal 30 may output a sound source through the link 610. In some cases, the link 610 may be a link in which playback starts from a point corresponding to a selected part of the lyrics of the sound source, not playing back the sound source from the beginning. In addition, in some cases, the link 610 may be a link in which playback starts from a point moved by a predetermined section from a point corresponding to a selected part of lyrics of the sound source. For example, it is a method in which if the point corresponding to the selected part of the lyrics of the sound source is at 1 minute and 40 seconds, playback starts at 1 minute and 35 seconds, which is a predetermined point of 5 seconds ahead. In addition, the user may select a point where playback of the sound source starts by selecting the selected part 330 or 340 of the lyrics.

However, when the sound source is played back in other terminal 30, the server 20 may determine whether other user of other terminal 30 is an account registered as a user in the sound source providing service of the server 20. If other user of other terminal 30 is an account registered as a user in the sound source providing service, it may be allowed to play back the entire sound source. However, if other user is not an account registered as a user in the sound source providing service, it may be allowed to play back only a part of the sound source. In some cases, there may be cases where some sections of a sound source allowed to an account not registered as a user in a sound source providing service do not include a point corresponding to a selected part of lyrics of a sound source. In this case, other terminal 30 may output a message indicating that playback of the corresponding point is impossible because the account is not registered as a user in the sound source providing service.

The user terminal 10 may receive an input of a user's interaction desiring to separately store the shared information. In this case, the user terminal 10 may store the shared information in the storage space of the user terminal 10 or in the server 20 or the like. To this end, the user terminal 10 may provide an interface 540 related to storing shared information. The user terminal 10 may convert and store the shared information in a storable file format, such as an image. In addition, the shared information may include a link capable of playing back the aforementioned sound source.

Figure 5:
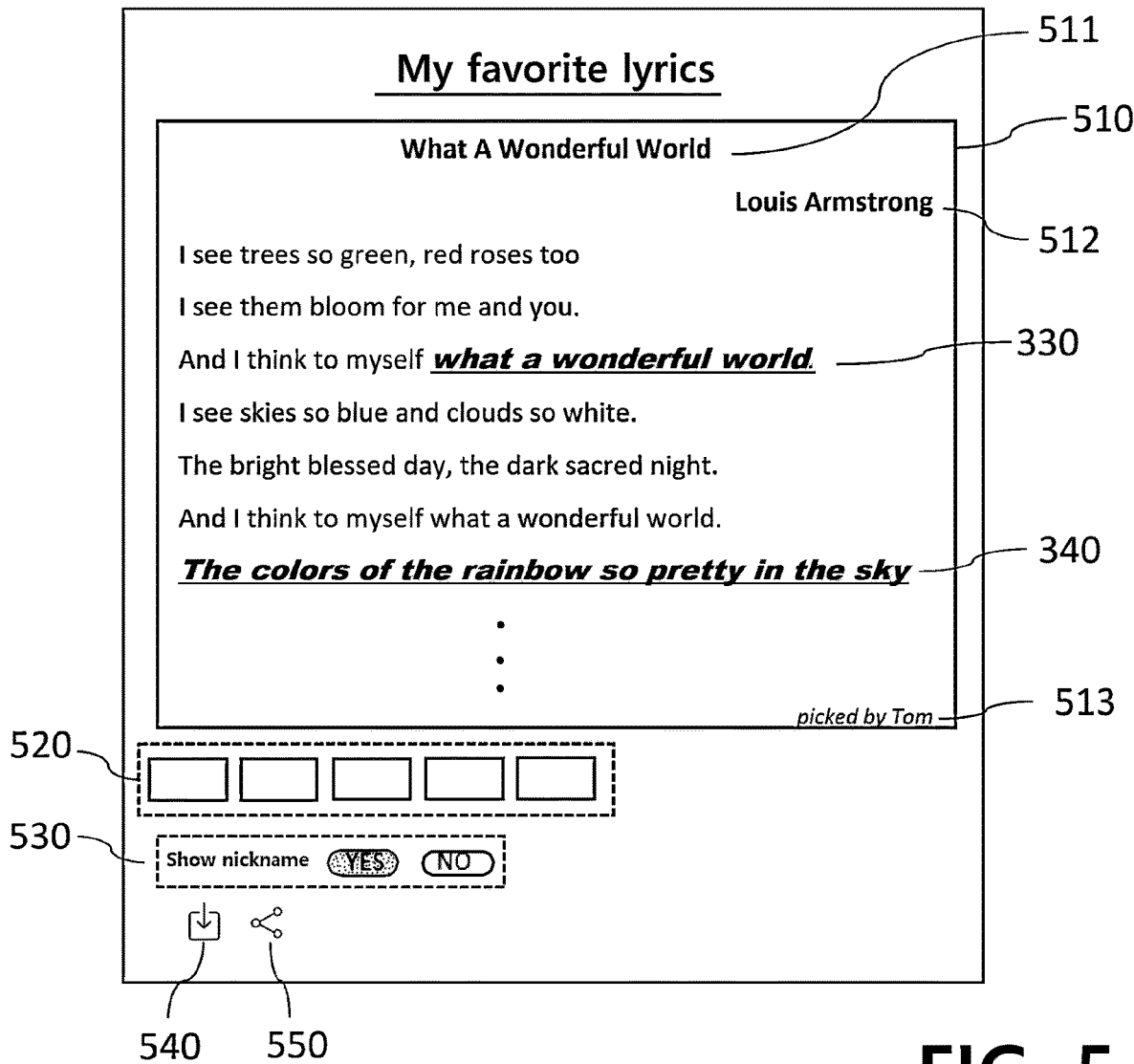
FIG. 5 illustrates an example of a screen of a user terminal on which shared information and a change interface are displayed in step S150 or step S160.

FIG. 5 illustrates an example of a screen of a user terminal 10 on which shared information and a change interface are displayed in step S150 or step S160.

As shown in FIG. 5, shared information 510 may be displayed on the screen of the user terminal 10. In the shared information 512, a title 511 of the sound source, an artist 512, and selected parts 330 and 340 of the lyrics may be displayed to be distinguished from other parts.

In addition, various change interfaces 520 and 530 capable of changing shared information may be displayed. In addition, a sharing interface 550 related to a function of transmitting shared information to the server 20 or sharing it to other terminal 30 may be displayed. In addition, a storage interface 540 related to a function of storing shared information in the user terminal 10 may be displayed.

Figure 6:
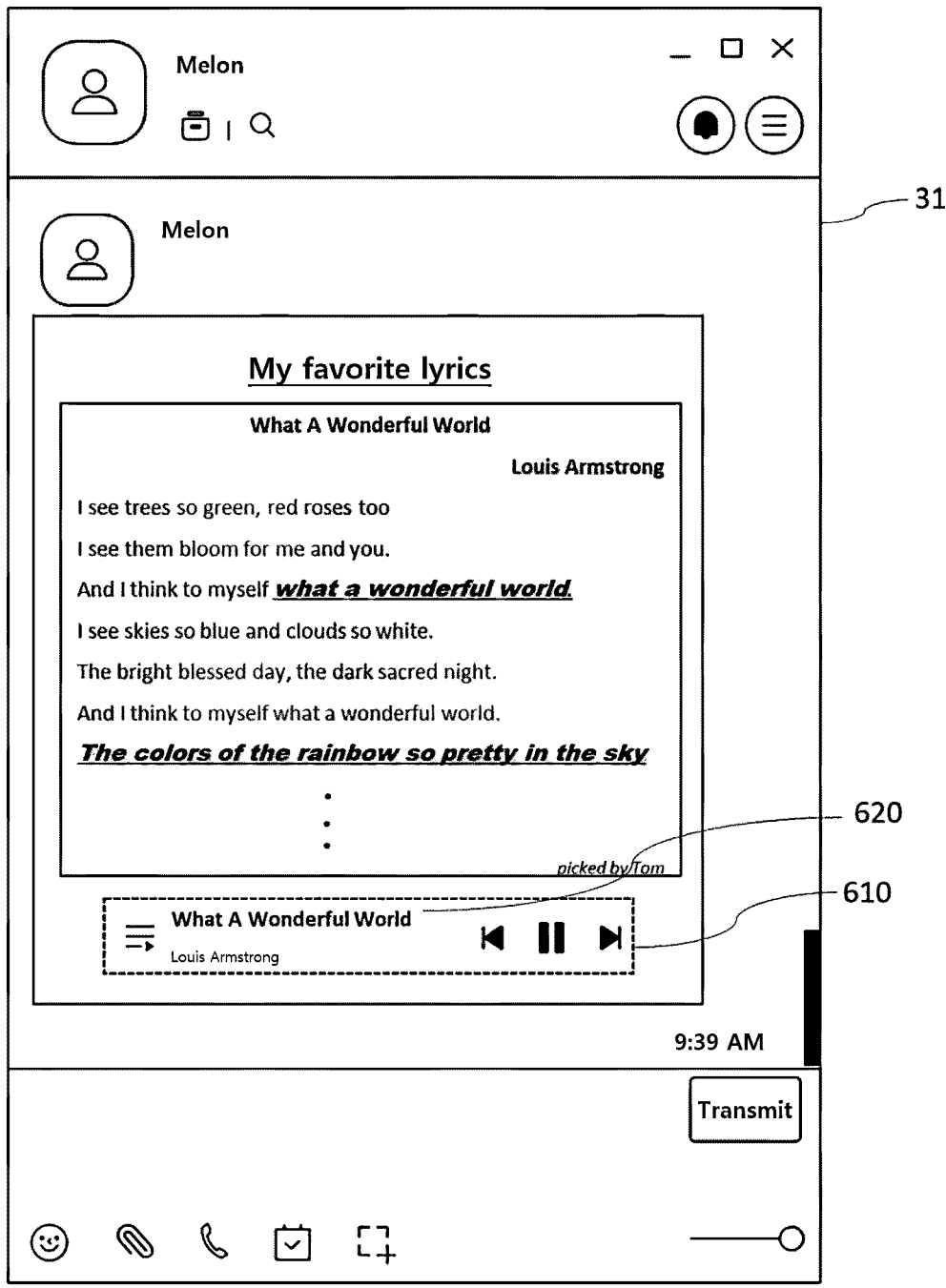
FIG. 6 illustrates an example of a screen of other terminal in which the user terminal shares shared information with other terminal in step S170 and the shared information is displayed on the other terminal.

FIG. 6 illustrates an example of a screen 31 of other terminal 30 in which the user terminal 10 shares shared information with other terminal 30 in step S170 and the shared information is displayed on the other terminal 30.

As shown in FIG. 6, the shared information may include a link 610 for playing back a sound source. In some cases, the sound source may be played from the beginning through a playback interface 610, or the selected parts 330 and 340 of the lyrics may be selected to start playback from the corresponding point of the sound source.

In addition, in some cases, a link 620 leading to a detailed page of the corresponding sound source may be included. In this case, a playback interface may be provided on the detailed page of the corresponding sound source.

Hereinafter, an embodiment of a method for displaying, by the user terminal 10 of the present invention, lyrics highlighted by other user will be described with reference to FIGS. 7 and 9.

Figure 7:
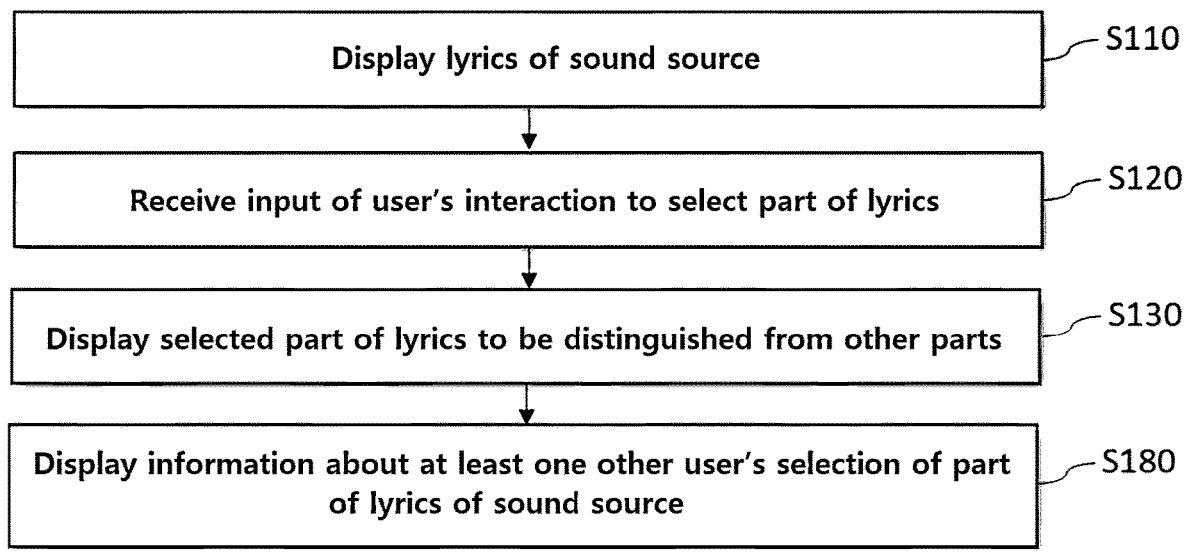
FIG. 7 is a flowchart of an embodiment of a method for displaying lyrics highlighted by other user.

FIG. 7 is a flowchart of an embodiment of a method for displaying lyrics highlighted by other user.

Steps S110, S120, and S130 are the same as those described above, so descriptions thereof will be omitted.

In step S180, the user terminal 10 displays information about a part of the lyrics of the sound source selected by at least one other user. Here, other user may include the user of the user terminal 10.

The user terminal 10 may provide an interface 320 related to viewing other user highlighting information while displaying lyrics in step S110. When a user performs an interaction with the interface 320, other user highlighting information viewing mode is activated to display information selected by other user for a part of lyrics of a corresponding sound source.

To this end, the user terminal 10 receives from the server 20 information selected by other user about the lyrics of the corresponding sound source. The user terminal 10 may receive, from the server 20, information about how many users have selected each specific part of lyrics. Specifically, it may receive information about the ratio of users who selected a specific part among users who selected (highlighted) part of the lyrics of the corresponding sound source. In addition, the user terminal 10 may receive information of other users who have selected part of the lyrics from the server 20. That is, it can receive information about other users' (who selected a part of the lyrics) IDs, nicknames, tastes, and whether they are celebrities selected by the server 20 according to predetermined criteria. Here, whether or not they are celebrities may be determined according to whether they are registered as artists in the sound source providing service provided by the server 20 or whether they are DJs having a certain number of followers or more.

The user terminal 10 may display a specific part of the lyrics of the sound source to be distinguished according to the number of users who have selected it. Specifically, the user terminal 10 may display lyrics with differences in text color, font size, font, underline, and italics from other parts according to the number of users who select a specific part among the lyrics of the sound source. For example, the user terminal 10 may take a method of displaying the part selected by the most users among the lyrics of the sound source in the darkest text color, and displaying the part selected by the next most users in a normal dark text color.

In addition, the user terminal 10 may display information of other users who have selected a specific part of the lyrics of the sound source. Here, other users may have a certain relationship with the user of the user terminal 10. For example, other users may be friends in an instant message service or SNS of the user of the user terminal 10. In addition, other users may be celebrities, or artists selected according to the taste of the user of the user terminal 10.

Figure 8:
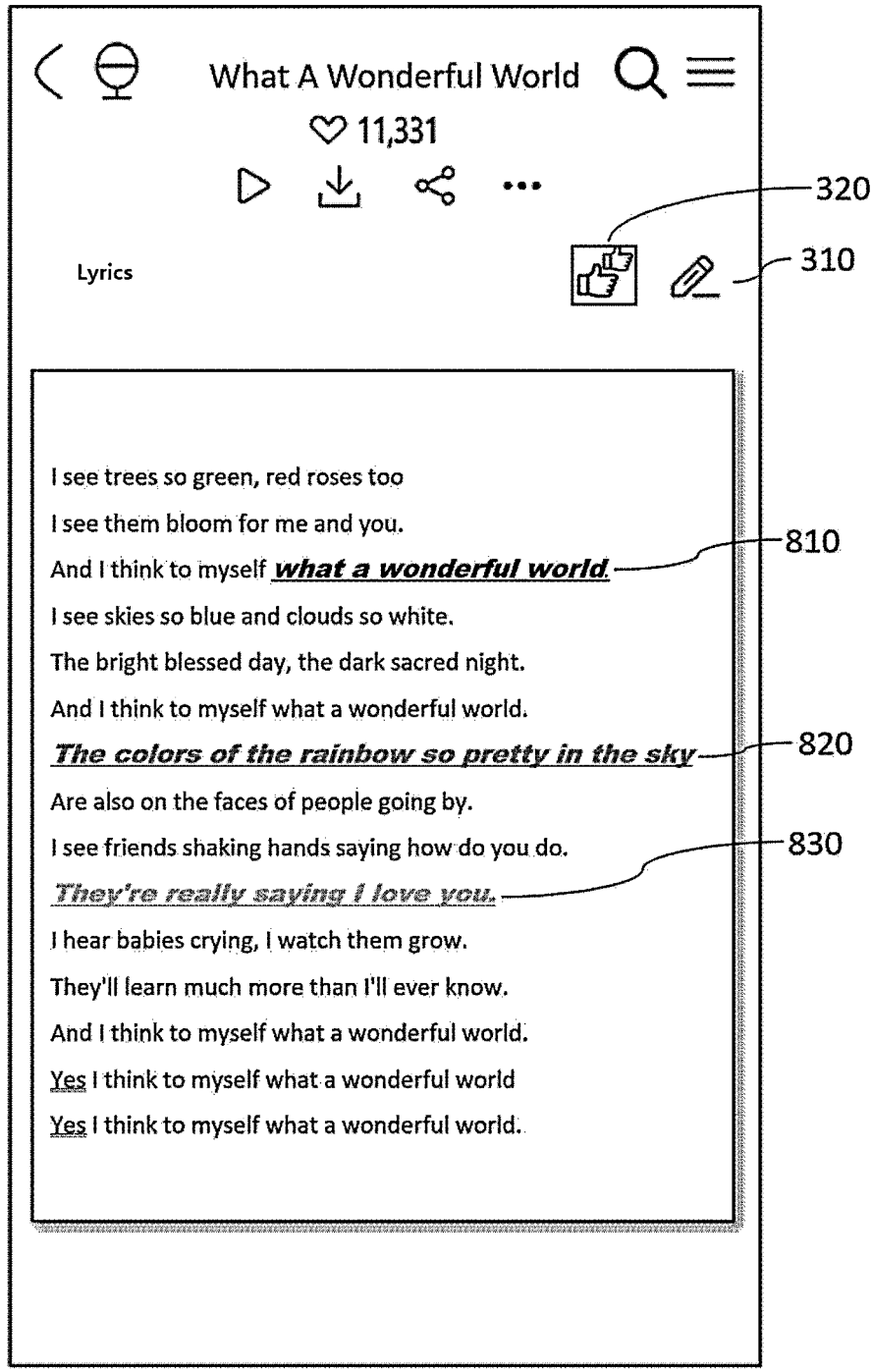
FIG. 8 illustrates an example of a screen of a user terminal displaying lyrics highlighted by other user in step S180.

FIG. 8 illustrates an example of a screen of a user terminal 10 displaying lyrics highlighted by other user in step S180.

As shown in FIG. 8, the user terminal 10 may provide an interface related to viewing other user highlighting information while displaying lyrics. In addition, the user terminal 10 may display a part selected by other user among lyrics of a sound source from other parts to be distinguished. In addition, among the parts selected by other users, the user terminal 10 may display the part 810 selected by the most users in the darkest text color, the part 820 selected by the next most users in a medium dark text color, and display the part 830 selected by the next most users in a light text color.

The criteria for distinguishing and displaying specific lyrics will be described. For example, the part 810 of the lyrics shown in FIG. 8 may be a part selected by 70% or more of users who selected (highlighted) some of the lyrics of the corresponding sound source, the part 820 may be a part selected by 50% or more of users who selected (highlighted) some of the lyrics of the corresponding sound source, and the part 830 may be a part selected by 30% or more of users who selected (highlighted) some of the lyrics of the corresponding sound source.

Figure 9:
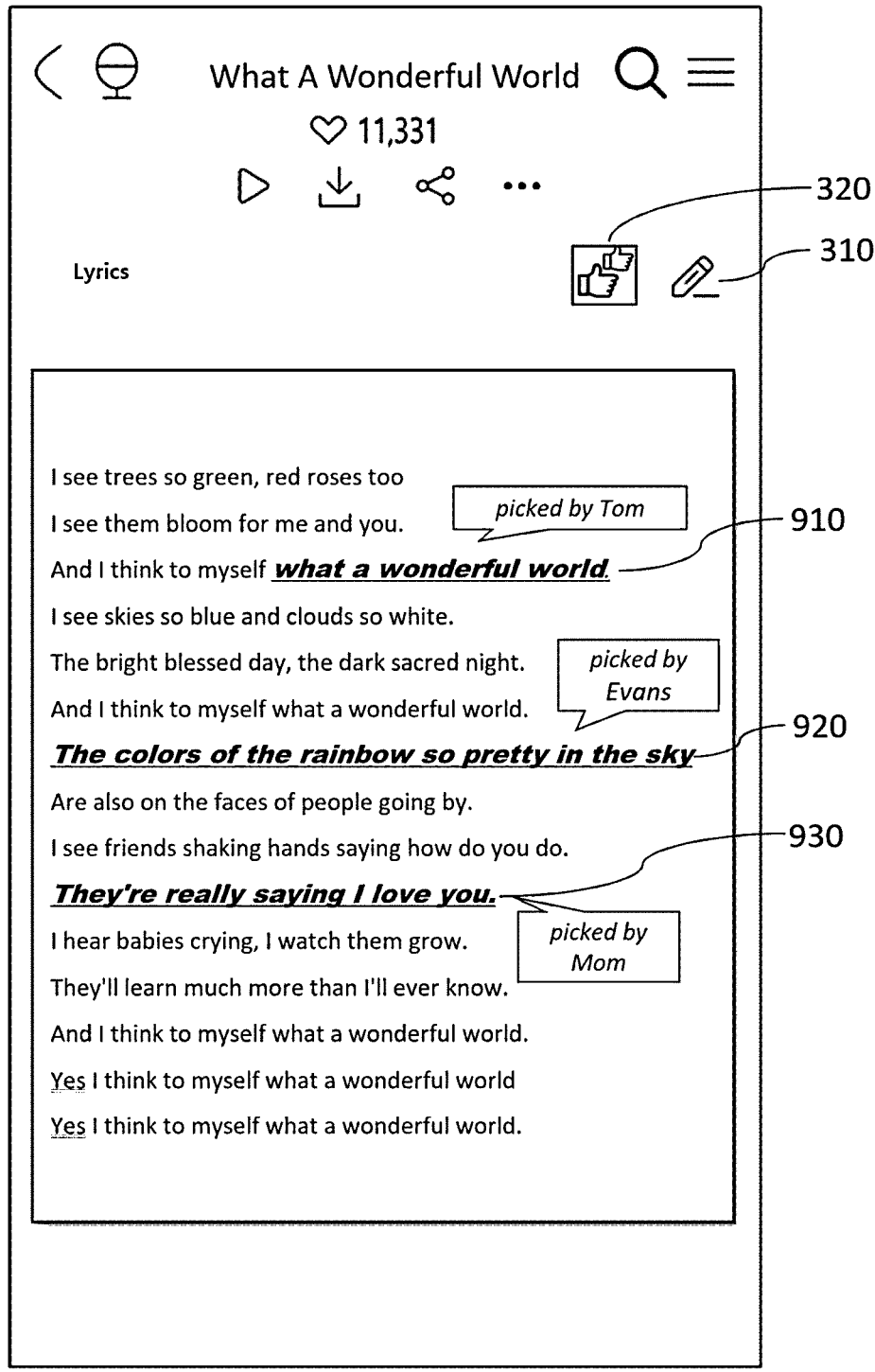
FIG. 9 illustrates another example of a screen of a user terminal displaying lyrics highlighted by other user in step S180.

FIG. 9 illustrates another example of a screen of a user terminal 10 displaying lyrics highlighted by other user in step S180.

As shown in FIG. 9, the user terminal 10 may display information about other users while displaying parts selected by other users among the lyrics of the sound source. Information displayed here may be information representing user information, such as ID and nickname.

For example, the part 910 indicates a part selected by the user Tom. Tom may be the user himself of the user terminal 10. In addition, the part 920 indicates a part selected by the user Evans. Evans may be a celebrity or an artist selected according to the taste of the user of the user terminal 10. In addition, the part 930 indicates a part selected by the user Mom. Mom may be a user stored as Mom in the contact information of the user of the user terminal 10. Here, Tom, Evans, and Mom are user information and may be information representing user information such as a nickname and an ID.

Hereinafter, with reference to FIG. 10, an embodiment of a method for displaying, by the user terminal 10 of the present invention, information including a part selected by a user among lyrics of at least one sound source will be described.

Figure 10:
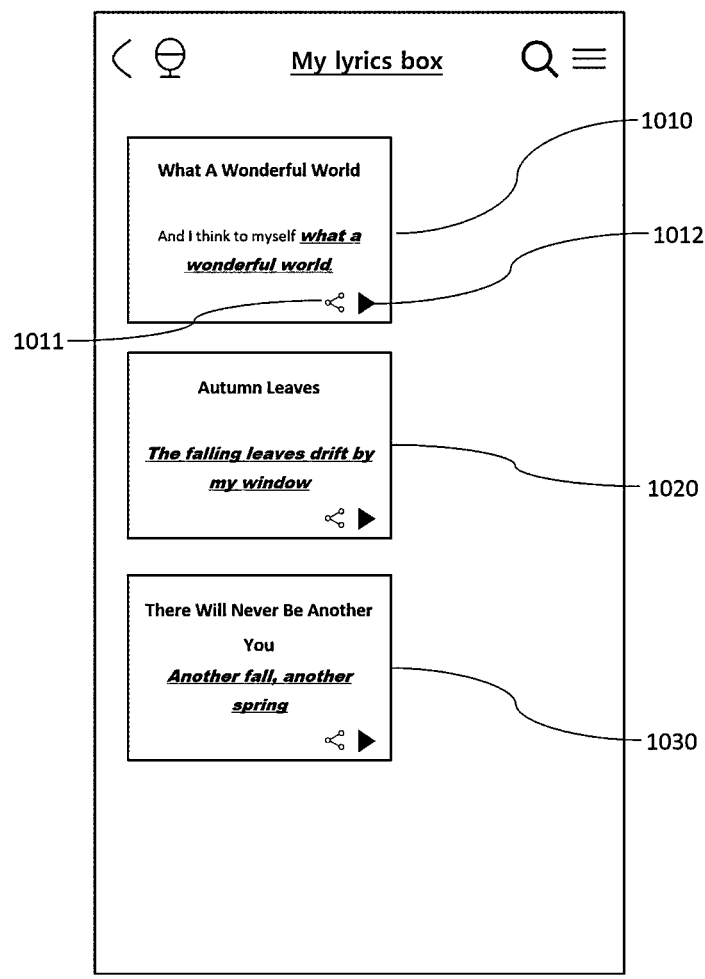
FIG. 10 illustrates an example of a screen on which a user terminal displays information including a part selected by a user among lyrics of at least one sound source.

FIG. 10 illustrates an example of a screen on which a user terminal 10 displays information including a part selected by a user among lyrics of at least one sound source.

As shown in FIG. 10, the user terminal 10 displays information 1010, 1020, and 1030 related to the user selecting a part of lyrics of at least one sound source. The user terminal 10 may display lyrics selected by the user by classifying them according to sound sources. Specifically, the title of the sound source and part of lyrics selected by the user may be displayed. In addition, an interface 1011 related to a function of sharing a part of lyrics selected by the user and an interface 1012 capable of playing back the corresponding sound source may be provided.

The user terminal 10 may combine and perform a plurality of steps described with reference to FIGS. 2 to 10 in order to highlight lyrics. For example, one user terminal 10 may perform steps S140, S150, S160, and S170 shown in FIG. 4, and may also perform step S180 shown in FIG. 7.

In addition, a computer program may perform the method described with reference to FIGS. 2 to 10. Such a computer program may be stored in a medium such as a hard disk, a CD, or a USB memory. In addition, such a computer program may be downloaded to the user terminal 10 through a network. Such a computer program may be installed and driven in the user terminal 10.

Figure 11:
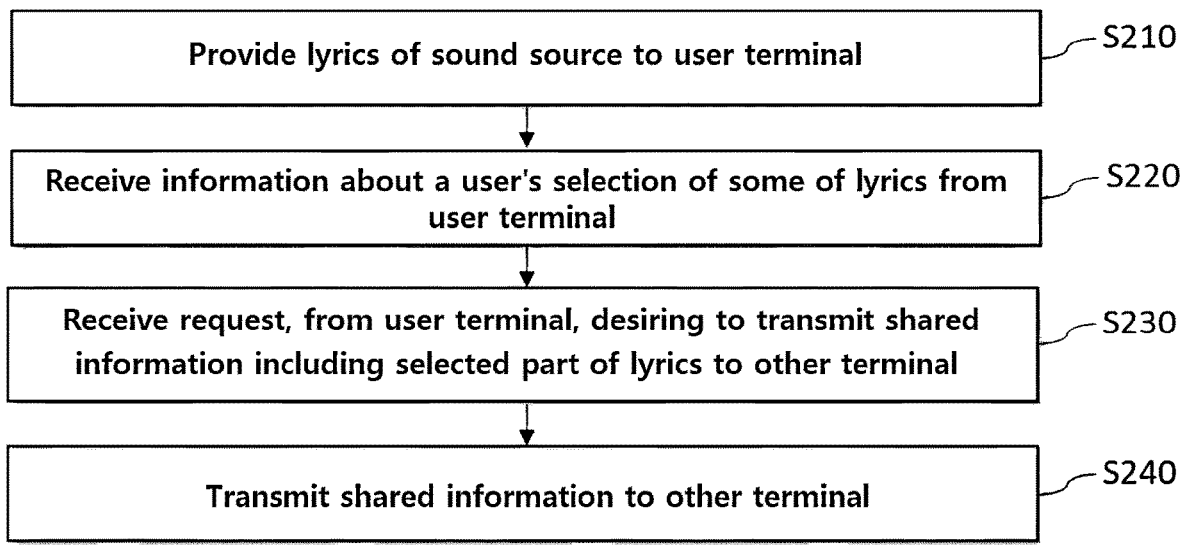
FIG. 11 is a flowchart of an embodiment of a method for highlighting lyrics by a server.

Hereinafter, an embodiment of a method for highlighting lyrics by the server 20 of the present invention will be described with reference to FIG. 11.

The server 20 of the present invention is connected to the user terminal 10 described with reference to FIGS. 2 to 10 through a network to perform a method of highlighting lyrics. Therefore, in the description of the server 20, while the user terminal 10 is described with reference to FIGS. 2 to 10, the previously described content will be omitted.

The server 20 includes a memory 21 and a processor 22. The processor 22 is connected to the memory 21 and is configured to execute instructions contained in the memory 21.

The server 20 provides lyrics of a sound source to the user terminal 10 in step S210.

The server 20 receives, from the user terminal 10, information that the user selected some of the lyrics in step S220. The server 20 may store the received information by matching it to the user's account information. Specifically, the server 20 may store the received information by matching it according to predetermined characteristics among user account information. For example, if the user account is a male in his 30s who enjoys listening to jazz, some of the lyrics selected by the user may be matched and stored as "taste: jazz, gender: male, age group: 30s". The server 20 may generate a database by storing such matching information for a plurality of user accounts.

The server 20 receives a request from the user terminal 10 desiring to transmit shared information including a selected part of lyrics to other terminal 30 in step S230. Then, the server 20 transmits the shared information to the other terminal 30 in step S240.

Then, the server 20 provides the user terminal 10 with information about at least one other user selecting a part of the lyrics of the sound source. This information may be based on a database generated by the server 20 by receiving information about selecting some of the lyrics from the user terminal 10 or other terminal 30.

Through the above-described lyrics highlighting method, the user terminal 10 and the server 20 that provide the same, and a computer program that executes the same, some of the lyrics selected by the user can be distinguished and displayed to the user or shared with other users. Therefore, there is an advantage in that it is possible to provide information on which lyric part of the sound source the user prefers, rather than simply information on which sound source the user enjoys listening to, to the user or other users. In addition, by providing a function to collect and view the selected lyrics, there is an advantage in that people can create and manage their own collection of lyrics or the like.

The technical features disclosed in each embodiment of the present invention are not limited to the corresponding embodiment, and unless incompatible with each other, the technical features disclosed in each embodiment may be merged and applied to other embodiments.

Therefore, in each embodiment, each technical feature is mainly described, but each technical feature may be merged and applied unless they are incompatible with each other.

The present invention is not limited to the above-described embodiments and accompanying drawings, and various modifications and variations will be possible from the viewpoint of those skilled in the art to which the present invention belongs. Therefore, the scope of the present invention should be defined by not only the claims of this specification but also those equivalent to these claims.

What is claimed is:

1. A method for highlighting lyrics, comprising:
    displaying, by a user terminal, lyrics of a sound source;
    receiving, by the user terminal, an input of a user's interaction to select part of the lyrics;
    displaying, by the user terminal, the selected part of the lyrics to be distinguished from other parts;
    when receiving an input of the user's interaction desiring to transmit shared information including the selected part of the lyrics to a server or other terminal, transmitting, by the user terminal, the shared information to the server or the other terminal;
    receiving, by the user terminal, from the server, information of at least one other user who has selected part of the lyrics; and
    displaying, by the user terminal, a relationship attribute with respect to the at least one other user together with the other user's selected part of the lyrics, the relationship attribute including whether the other user is identified as a celebrity, wherein celebrity status is determined by whether the other user is registered as an artist in a sound source providing service or has at least a predetermined number of followers.

2. The method for highlighting lyrics of claim 1, further comprising:

providing, by the user terminal, an interface capable of changing the shared information, and when receiving an input of a user's interaction desiring to change the shared information through the interface, displaying, by the user terminal, the shared information changed according to the user's interaction desiring to change.

3. The method for highlighting lyrics of claim 2, wherein the interface is an interface related to any one of a function of changing a background image of the shared information and a function of selecting whether or not to display a user's identifier in the shared information.

4. The method for highlighting lyrics of claim 1, further comprising storing, by the user terminal, the shared information in a storage space of the user terminal when receiving, by the user terminal, a user's interaction desiring to store the shared information.

5. The method for highlighting lyrics of claim 1, wherein the shared information comprises a link for playing back the sound source.

6. The method for highlighting lyrics of claim 5, wherein the link is a link in which playback starts from a point corresponding to a selected part of the lyrics of the sound source or a point moved by a predetermined section from the point.

7. The method for highlighting lyrics of claim 1, wherein when the user terminal plays back the sound source, the user terminal is configured to output information related to a selected part of the lyrics, and wherein the outputting of the information is at least one of displaying a fact that there is a selected part of the lyrics, displaying a selected part of the lyrics, and outputting a part corresponding to the selected part of the lyrics of the sound source to be distinguished from other parts.

8. The method for highlighting lyrics of claim 1, further comprising displaying, by the user terminal, information about at least one other user's selection of a part of the lyrics of the sound source.

9. The method for highlighting lyrics of claim 8, wherein, in the displaying the information selected by the other user, the user terminal is configured to display a specific part of the lyrics of the sound source to be distinguished according to the number of users selected.

10. The method for highlighting lyrics of claim 8, wherein, in the displaying the information selected by the other user, the user terminal is configured to display information of the other user together.

11. The method for highlighting lyrics of claim 1, further comprising displaying, by the user terminal, information including a selected part of lyrics of at least one sound source.

12. A non-transitory storage medium storing a computer program, when executed by at least a processor to perform the method of claim 1.

* * * * *